April 23, 1968

J. R. HARRELL 3,379,316

AUTO SNACK TRAY

Filed Oct. 23, 1965

INVENTOR
JOSHUA R. HARRELL

BY *Robert M. Dunning*

ATTORNEY

United States Patent Office 3,379,316
Patented Apr. 23, 1968

3,379,316
AUTO SNACK TRAY
Joshua R. Harrell, 1033 N. Pate St.,
Carlsbad, N. Mex. 88220
Filed Oct. 23, 1965, Ser. No. 503,767
7 Claims. (Cl. 211—73)

ABSTRACT OF THE DISCLOSURE

This invention relates to foldable service tray for a vehicle seat which is lower adjoining the seatback than at the forward edge thereof. The tray includes a platform adapted to rest on the forward edge of the seat and having at its rear end a leg panel extending downwardly from the platform and supported by a brace panel extending forwardly and upwardly from the lower edge of the leg panel and locked to the platform.

---

Figure 1:
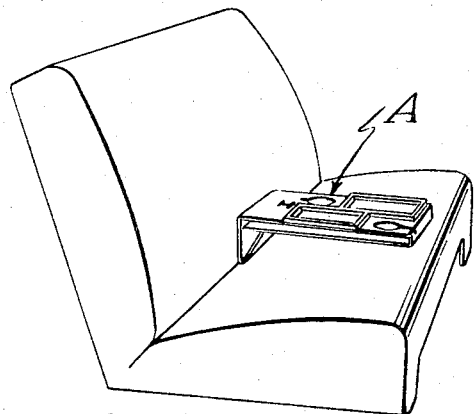

This invention relates to an improvement in auto snack trays and deals particularly with a structure designed to rest upon the seat of an automobile and to support food and beverage.

Many folks like to eat out in the open air in their cars. If they eat at a drive-in restaurant, some sort of trays or other supports are often provided for supporting the food. However, these trays are oftentimes attached adjoining the window openings of the car to project outwardly therefrom. Supports of this type are not particularly practical in rainy weather.

When it is desired to picnic in the car, there is usually no flat area on which the food may be supported. It is a purpose of the present invention to provide an inexpensive support which may be used to hold food and glasses of liquid on a substantially horizontal plane during the luncheon period, and which may be folded up and stored in a small area when not in use.

An object of the present invention resides in the provision of an elongated sheet of material such as corrugated paperboard or fiberboard which may be folded to provide a firm support for glasses, cans or bottles of soft drink, as well as sandwiches or the like, and which may be rested upon the seat of an automobile to hold the material on a generally horizontal plane.

It is recognized that automobile seats are substantially higher at their forward edge than at their rear edge, making it virtually impossible to support a glass, a sandwich, or any such item on the seat without having it slide toward the junction of the seat and the seat-back. It has been found that by providing a tray-like body with a leg at one end thereof, the top of the tray-like body may be supported on a substantially horizontal plane when the leg is positioned at the junction between the seat and the seat-back.

A further feature of the present invention resides in the provision of a tray-like body including a pair of parallel panels, the upper of which provides a support for objects such as sandwiches or the like. This upper panel is provided with spaced apertures designed to accommodate a glass, bottle or can, the lower end of which rests upon the lower of the two panels. As a result, the apertures hold the receptacle of liquid from moving to any substantial extent in any direction and at the same time hold this receptacle from accidentally tipping and spilling its contents.

A further feature of the present invention lies in the fact that the structure comprises a series of panels of paperboard or similar material which are hingedly connected together so that the entire structure may be flattened out and stored in a compact state.

An added feature of the present invention resides in the provision of a novel means of locking the device into erected position. When erected, the weight of items placed upon the surface of the device have a tendency to increase the locking of the panels together.

These and other objects and novel features of the present invention will be more clearly and fully set forth in the following specification and claims.

Figure 3:
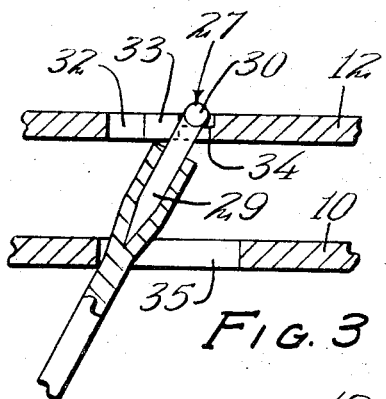
Figure 2:
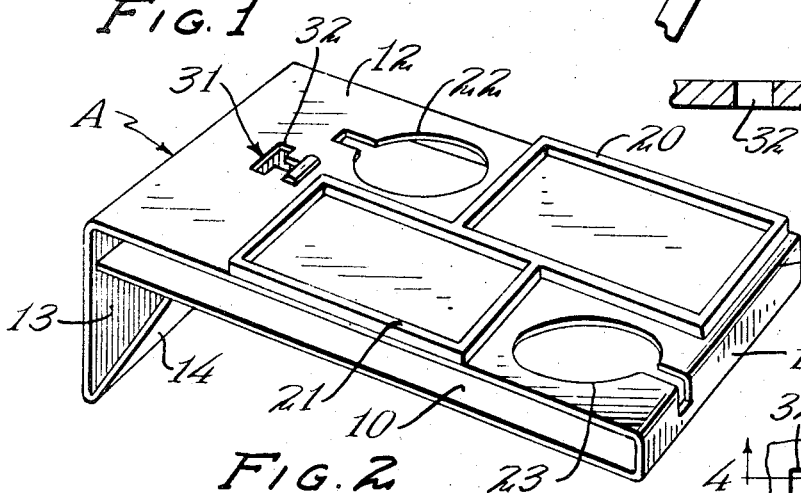
Figure 4:
Figure 5:
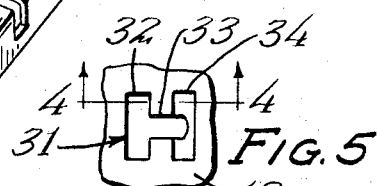
Figure 6:
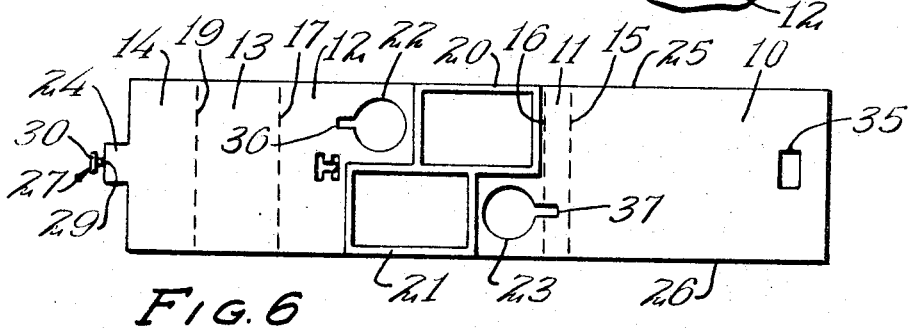

In the drawings forming a part of the specification:
FIGURE 1 is a perspective view showing diagrammatically an automobile seat with the serving tray supported thereupon.
FIGURE 2 is a perspective view of the serving tray.
FIGURE 3 is a vertical sectional view through a portion of the tray, showing the manner in which the tray is locked in erected position.
FIGURE 4 is a sectional view similar to a portion of FIGURE 3 showing the recess in which the locking members engage.
FIGURE 5 is a plan view of the locking slot and recess.
FIGURE 6 is a diagrammatic view of the blank from which the device is formed.

The present structure is not specifically designed as a "throw away" item, and is purposely made so that it can be continuously used for a period of time. At the same time, it is the intention to produce the structure at a low enough cost so that it can be replaced from time to time. When not in use, the entire snack tray may fold either into a single plane or into a pair of layers of material in face contact.

In the particular arrangement illustrated, the snack tray A is made of stiff corrugated paperboard having a moisture resistent surface thereupon to stand up in use. The blank from which the tray is formed is illustrated in FIGURE 6 of the drawings. As is indicated, the generally rectangular blank includes a false bottom panel 10, a forward wall 11, a top panel 12, a leg panel 13, and a brace panel 14 which are hinged connected along parallel fold lines 15, 16, 17 and 19. The false bottom panel 10 and the top panel 12 are substantially coextensive in length, and the front wall 11 is of just sufficient height to permit a cup, glass, or bottle of soft drink, to be effectively supported as will be described.

The top panel 12 is provided with a pair of generally rectangular frames 20 and 21. The frame 21 is preferably offset from the frame 20 so that the weight of the materials placed upon the snack tray will be well distributed over the areas. A pair of offset apertures 22 and 23 are also provided in the top panel 12, these apertures being of proper diameter to accommodate a cup of coffee or other liquid, or a glass, bottle, or can of a beverage. The cup or other object which is placed through either of the apertures 22 or 23, rests upon the false bottom panel 10, and is effectively supported thereby.

A tongue or ear 24 project from the free end of the brace panel 14, this tongue usually being located midway between the longitudinal side edges 25 and 26 of the tray. A generally T-shaped projection 27 projects from the end of the tongue 24 as is indicated in FIGURES 3 and 6 of the drawings. The T-shaped locking member 27 includes a pointed shank 29 which is anchored in the end of the tongue 24 to project a short distance therefrom. A cross-member 30 is provided at the end of the locking member 27.

As is indicated in FIGURES 4 and 5 of the drawings, the top panel 12 is provided with a T-shaped slot 31 extending therethrough, the transversely extending portion 32 of the slot being of sufficient length to accommodate the cross-bar 30 of the locking member 27. A longitudinally extending portion 33 of the T-shaped slot 31 extends in a direction toward the fold line 16 connecting the top panel 12 to the front wall 11. A recess 34 communicates with the forward end of the forwardly extending portion 33 of the T-shaped slot 31. This recess 34 is of proper dimension to accommodate the cross-bar 30 of the locking member 27, and comprises a pocket designed to hold the locking member from longitudinal movement relative to the tray top 12. The recess 34 may be formed by use of an auxiliary piece of material underlying the top panel 12,, or may be formed by die-cutting a rectangular area in the top surface of the corrugated panel 12, and crushing the corrugated panel within this area to form a recess or pocket.

The false bottom panel 10 is provided with an aperture 35 extending therethrough which is of sufficient width to accommodate the tongue 24. When it is desired to use the snack tray, it is only necessary to fold the false bottom 10 into spaced parallel relation to the top panel 12,, folding the leg panel 13 downwardly at right angles to the top panel 12, and folding the brace panel 14 upwardly, inserting the tongue 24 through the slot or aperture 35. By flexing the panels slighty, the T-shaped locking member 27 may be inserted through the transverse portion 32 of the slot 31, and the head 30 of the locking member may be moved forwardly to engage in the recess 34. The snack tray may be unfolded by reversing the aforementioned process.

In the event the cups or mugs to fit in the apertures 22 and 23 are provided with handles, slots 36 and 37 may adjoin the apertures to accommodate these handles.

In accordance with the patent statutes, I have described the principles of construction and operation of my improvement in auto snack tray, and while I have endeavored to set forth the best embodiment thereof, I desire to have it understood that changes may be made within the scope of the following claims without departing from the spirit of my invention.

I claim:

1. A foldable service tray for use with a vehicle seat and seatback, the seat being substantially lower at its junction with the seatback than at the forward edge thereof, the tray comprising an elongated strip including a series of transverse fold lines dividing the strip into a false bottom panel, a front panel, a top panel, a leg panel, and a brace panel, and locking means on said brace panel holding said panels with said false bottom panel beneath, and substantially parallel to said top panel, and holding said leg panel extending downwardly at substantially right angles to said top panel.

2. The structure of claim 1 and in which said top panel is apertured to accommodate glasses and the like resting upon said false bottom panel.

3. The structure of claim 1 and in which said locking means includes a headed locking member extending through said false bottom panel and said top panel and engaged therewith.

4. The structure of claim 1 and in which said locking means comprises a T-shaped locking member projecting from the end of said brace panel and extending through said false bottom panel and said top panel, and including a socket in said top panel for accommodating the cross-member of said T-shaped locking member.

5. The structure of claim 2 and including means on said top panel defining peripherally extending food retaining means.

6. A serving tray for use with a vehicle seat and seatback, the seat being substantially lower at its junction with the seatback than at the forward edge thereof, the tray including an elongated platform having a forward end adapted to rest upon the forward edge of the seat, a leg panel at the rear end of said platform extending downwardly therefrom at substantially right angles thereto to engage the seat near its junction with the seatback, a brace panel hinged to the lower end of said leg panel, and locking means on said brace panel engaging said platform and holding said leg panel in angular relation to said platform.

7. The structure of claim 6 and in which said platform includes a top panel and a false bottom panel supported in spaced parallel relation.

References Cited

UNITED STATES PATENTS

| | | | |
|---|---|---|---|
| D. 199,993 | 1/1965 | Cohen | 108—44 X |
| 2,355,206 | 8/1944 | Davidson | 211—77 X |
| 3,163,287 | 12/1964 | Barnett | 108—44 X |
| 3,244,125 | 4/1966 | Mackey | 108—44 X |
| 3,318,456 | 5/1967 | Lipe | 297—194 X |

ROY D. FRAZIER, *Primary Examiner.*

W. D. LOULAN, *Assistant Examiner.*